United States Patent
Siebers et al.

(10) Patent No.: US 11,312,652 B2
(45) Date of Patent: *Apr. 26, 2022

(54) TRANSPARENT, DYED COOK TOP OR HOB WITH IMPROVED COLORED DISPLAY CAPABILITY AND A METHOD FOR THE MANUFACTURING OF SUCH A COOK TOP OR HOB

(71) Applicant: SCHOTT AG, Mainz (DE)

(72) Inventors: Friedrich Siebers, Nierstein (DE);
Ulrich Schiffner, Mainz (DE);
Wolfgang Schmidbauer, Mainz (DE);
Klaus Schoenberger, Mainz (DE)

(73) Assignee: Schott AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,133

(22) Filed: Jun. 4, 2019

(65) Prior Publication Data

US 2019/0315652 A1  Oct. 17, 2019

Related U.S. Application Data

(63) Continuation of application No. 14/711,849, filed on May 14, 2015, now Pat. No. 10,562,807, which is a
(Continued)

(30) Foreign Application Priority Data

Oct. 7, 2008  (DE) .......................... 102008050263.4

(51) Int. Cl.
*C03C 10/14* (2006.01)
*C03C 10/12* (2006.01)
(Continued)

(52) U.S. Cl.
CPC ........ *C03C 10/0027* (2013.01); *C03B 27/012* (2013.01); *C03C 3/087* (2013.01);
(Continued)

(58) Field of Classification Search
CPC ..... C03C 10/009; C03C 10/0027; C03C 4/10; H05B 3/74
See application file for complete search history.

(56) References Cited

U.S. PATENT DOCUMENTS 3,756,798 A    9/1973  Ernsberger
4,140,645 A ‡  2/1979  Beall
(Continued)

FOREIGN PATENT DOCUMENTS

CN    1326903    12/2001
CN    1332127    1/2002
(Continued)

OTHER PUBLICATIONS

English translation of DE19939787A1.‡
(Continued)

*Primary Examiner* — Karl E Group
(74) *Attorney, Agent, or Firm* — Pear Cohen Zedek Latzer Baratz LLP

(57) ABSTRACT

Transparent, dyed cook top or hob with improved color display capability, consisting of a glass ceramic with high quartz mixed crystals as predominant crystal phase, whereby the glass-ceramic contains none of the chemical refining agents arsenic oxide and/or antimony, with transmission values of greater than 0.1% in the range of the visible light within the entire wavelength range greater than 450 nm, a light transmission in the visible of 0.8-2.5% and a transmission in the infrared at 1600 nm of 45-85%.

36 Claims, 2 Drawing Sheets

Related U.S. Application Data continuation of application No. 13/123,215, filed as application No. PCT/EP2009/006683 on Sep. 16, 2009, now Pat. No. 9,061,937.

(51) Int. Cl.

| | | |
|---|---|---|
| *H05B 3/74* | (2006.01) | |
| *C03C 10/00* | (2006.01) | |
| *F24C 15/10* | (2006.01) | |
| *C03C 3/095* | (2006.01) | |
| *C03C 3/097* | (2006.01) | |
| *C03C 8/04* | (2006.01) | |
| *C03C 8/02* | (2006.01) | |
| *C03C 3/087* | (2006.01) | |
| *C03B 27/012* | (2006.01) | |

(52) U.S. Cl.
CPC .............. *C03C 3/095* (2013.01); *C03C 3/097* (2013.01); *C03C 8/02* (2013.01); *C03C 8/04* (2013.01); *C03C 10/0009* (2013.01); *F24C 15/10* (2013.01); *H05B 3/74* (2013.01)

(56) References Cited

U.S. PATENT DOCUMENTS

| | | | |
|---|---|---|---|
| 4,461,839 A | | 7/1984 | Rittler |
| 4,835,121 A | | 5/1989 | Shibuya et al. |
| 5,212,122 A | ‡ | 5/1993 | Pannhorst |
| 5,446,008 A | ‡ | 8/1995 | Krolla ................ C03C 10/0027 501/4 |
| 6,413,906 B1 | ‡ | 7/2002 | Shimatani .......... C03C 10/0027 501/4 |
| 6,930,289 B2 | | 8/2005 | Siebers et al. |
| 7,473,660 B2 | | 4/2009 | Comte |
| 7,718,929 B2 | | 5/2010 | Shimatani et al. |
| 7,981,823 B2 | ‡ | 7/2011 | Siebers |
| 9,061,937 B2 | ‡ | 6/2015 | Siebers ................... C03C 3/087 |
| 9,156,727 B2 | ‡ | 10/2015 | Siebers ............... C03C 10/0045 |
| 10,562,807 B2 | * | 2/2020 | Siebers ................... C03C 3/087 |
| 2002/0058117 A1 | ‡ | 5/2002 | Schultheis |
| 2005/0252503 A1 | ‡ | 11/2005 | Siebers |
| 2005/0255983 A1 | ‡ | 11/2005 | Becker |
| 2007/0004578 A1 | ‡ | 1/2007 | Monique Comte |
| 2007/0056961 A1 | | 3/2007 | Shimatani et al. |
| 2007/0232476 A1 | ‡ | 10/2007 | Siebers |
| 2008/0026927 A1 | ‡ | 1/2008 | Monique Comte |
| 2008/0139375 A1 | | 6/2008 | Wennemann et al. |
| 2013/0140293 A1 | ‡ | 6/2013 | Doerk |

FOREIGN PATENT DOCUMENTS

| | | | |
|---|---|---|---|
| CN | 1454189 | | 11/2003 |
| CN | 1696072 | ‡ | 11/2005 |
| CN | 1784363 | | 6/2006 |
| CN | 1871179 | | 11/2006 |
| CN | 101085699 | | 12/2007 |
| DE | 43 21 373 A1 | ‡ | 1/1995 |
| DE | 199 39 787 A1 | | 2/2001 |
| DE | 19939787 C2 | ‡ | 11/2003 |
| DE | 10338165 | | 5/2005 |
| DE | 102008040097 | | 1/2010 |
| EP | 0220333 | | 5/1987 |
| EP | 1465 460 A2 | ‡ | 10/2004 |
| JP | 11-100229 | | 4/1999 |
| JP | 11-100231 | | 4/1999 |
| JP | H11-100230 | ‡ | 4/1999 |
| JP | 2004-523446 | ‡ | 8/2004 |
| JP | 2004-251615 | ‡ | 9/2004 |
| JP | 2005-63949 A | ‡ | 3/2005 |

OTHER PUBLICATIONS

Plessers et al., Rapidox: A new took for redox measurements in glass samples, Ceram. Eng. Sci. Proc., 19(1) (1998) 145-158.‡

Hans Bach, ed. Low thermal expansion glass ceramics, Springer-Verlag Berlin Heidelberg 1995, p. 66.

Wolgram Holand and George Beall, Glass-ceramic technology, The American Ceramic Society 2002, table 2-7.

Hans Bach and Dieter Krause, eds. Low thermal expansion glass ceramics, second edition, Springer-Verlag Berlin Heidelberg 2005, p. 63.

* cited by examiner
‡ imported from a related application

TRANSPARENT, DYED COOK TOP OR HOB WITH IMPROVED COLORED DISPLAY CAPABILITY AND A METHOD FOR THE MANUFACTURING OF SUCH A COOK TOP OR HOB

CROSS-REFERENCE TO RELATED APPLICATIONS

This application is a continuation of U.S. patent application Ser. No. 14/711,849, filed May 14, 2015, now U.S. Pat. No. 10,562,807, which is a continuation application of U.S. patent application Ser. No. 13/123,215, filed Jun. 3, 2011, now U.S. Pat. No. 9,061,937, which is a National Phase Application of PCT International Application No. PCT/EP2009/006683, International Filing Date 16 Sep. 2009, claiming priority of Patent Application DE 10 2008 050 263.4, filed Oct. 7, 2008, each incorporated by reference in its entirety.

FIELD OF THE INVENTION

The invention relates to a transparent, dyed cook top or hob with improved colored display capability, comprising a glass-ceramic with high-quartz mixed crystals as predominant crystalline phase, and a method for the production as well.

Cooking hobs with a glass-ceramic plate as cook top or cooking surface are common technology. Such glass-ceramic plates are usually available as flat plates or shaped three-dimensionally.

Glass-ceramics with high-quartz mixed mixeds as prevailing crystalline phase are made of crystallizable lithium aluminum silicate glasses.

The production of these glass-ceramics is effected in several steps.

Glass-ceramic is produced in several stages. The crystallization is started by a glass consisting of a mixture of broken pieces of glass and a powdered mixture of raw materials which is usually melted at temperatures between 1500 and 1650° C. During the melting process usually arsenic and/or antimony oxide are used as refining agents. These refining agents are compatible with the required glass-ceramic properties and lead to excellent blister qualities of the molten mass. Even though these substances are firmly embedded in the glass structure, they are still disadvantageous in view of safety and environmental protection aspects. Therefore, during the raw material extraction, raw material processing and because of the evaporation during the melt, special precautions must be obeyed.

Recently, particularly the application of $SnO_2$ is described as harmless refining agent. In order to achieve perfect blister qualities at conventional melting temperatures (maximum approx. 1680° C.) besides $SnO_2$, preferably halide compounds are used as additional refining agents. Thus, in Japanese applications JP 11 100 229 A and JP 11 100 230 A, the application of 0.1-2 weight % $SnO_2$ and 0-1 weight % Cl is described. According to these documents the coloring is achieved by addition of $V_2O_5$ as sole colorant.

The addition of 0.05-1 weight % fluorine (US 2007 0004578 A1) or 0.01-1 weight % bromine (US 2008 0026927 A1) to support the refine by $SnO_2$ is disclosed as well. Also in these documents refining temperatures below 1700° C. are described. The main coloring agent is $V_2O_5$. A disadvantage with the addition of halides as they are evaporating so highly during the melting temperature is that they are producing toxic compounds such as HF.

The application of $SnO_2$ in relation with high-temperature refining above 1700° C. to achieve good blister quality is described in DE 199 39 787 C2. This document, however, provides no guidance for the achievement of good indication capability within the wavelength range beginning at 450 nm.

DESCRIPTION OF THE INVENTION

Figure 1:
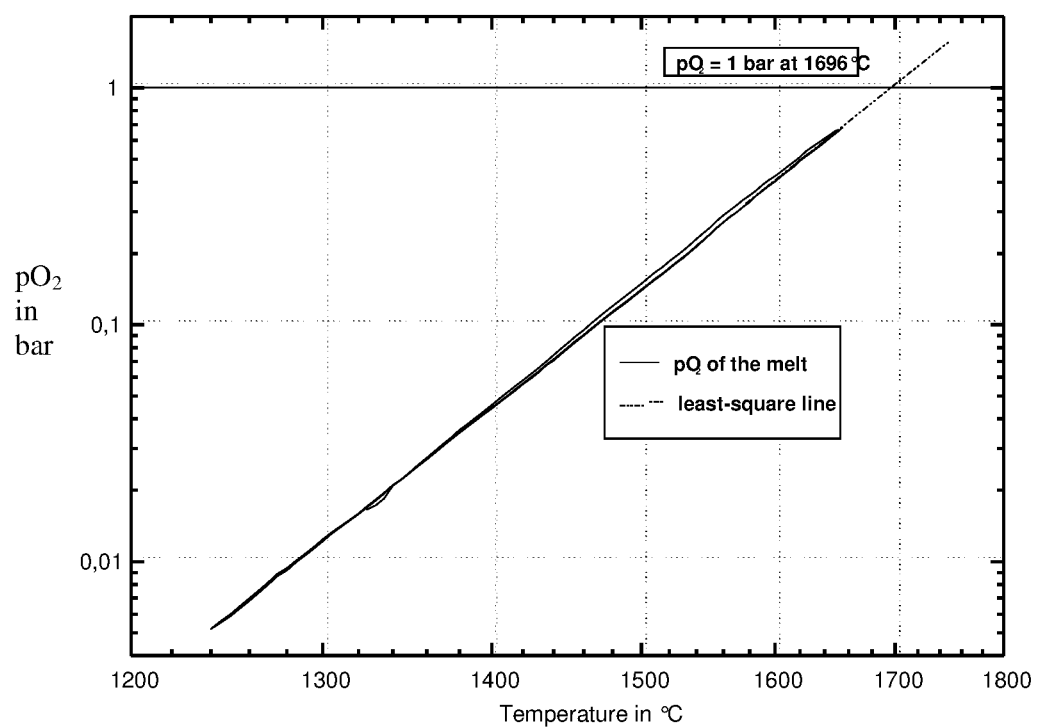
FIG. 1 provides a graph measuring $pO_2$ as a function of temperature for glasses according to the present invention.

After melting and refining normally the glass is experiencing a hot forming by rolling or latterly by floating in order to produce plates. On the one side for an economic production a low melting temperature and a low processing temperature VA is desired, on the other side the glass should not show any devitrification during the shaping process. This means the forming of interfering crystals is not allowed as they could affect the strength in the starting glasses and thereof produced glass-ceramics. As the forming is performed close to the processing temperature VA (viscosity $10^4$ dPas) of the glass, it must be guaranteed that the upper devitrification temperature of the melt is close to, and preferably at a lower temperature than the processing temperature in order to prevent the formation of interfering crystals. Then the starting glass is transformed into the glass-ceramic article by controlled crystallization.

This ceramization is performed in a two-step temperature process in which initially through generating nucleation at a temperature between 680 and 800° C., seed crystals are produced usually made of $ZrO_2/TiO_2$-mixed crystals. Also $SnO_2$ may be involved in the nucleation. Due to subsequent increase of temperature the high-quartz mixed mixed grows up on these crystallization nuclei or seed crystals. High crystal growth rates, as they are desired for an economical, fast ceramization are achieved at temperatures of 850 to 950° C. At this maximum production temperature, the structure of the ceramic mix homogenizes and the optical, physical and chemical properties of the glass-ceramic will be adjusted. If desired, the high quartz mixed crystals could be subsequently transformed into keatite-mixeds. The transition into keatite-mixeds is achieved by an increase of temperature in a range of about 950 to 1200° C. Through the transition of high quartz into keatite-mixeds the thermal expansion coefficient of glass-ceramic increases while the transparency decreases, this is caused by the increase in size of the crystals and concomitant light scattering. In general, glass-ceramics with keatite-mixeds as main phase thus are translucent or opaque and the herewith associated light scattering has a negative effect on the display capabilities.

A key feature of these glass-ceramics with high quartz mixed crystals as main crystal phase is the manufacture of materials which have the property of an extremely low thermal expansion coefficient of $<0.5 \times 10^{-6}/K$ in the range from room temperature up to 700° C. and above. Due to the low thermal expansion, these glass ceramics possess an excellent temperature difference resistance and thermal shock resistance.

Concerning the use as a cooking area the technical development based on the requirements resulting from the practical use has led to very specific and partially conflicting demands on the transmission.

To prevent the disturbing visibility of the technical components under the glass-ceramic cooking surface and to avoid the dazzling effect caused by radiant heating elements, particularly bright halogen heaters, the glass ceramic cook tops or hobs are limited in their light transmission. On the other hand the radiant heaters should be clearly visible during operation, even when running at low power. Also for the display capability a certain degree of light transmission is required as the common red LEDs are mounted beneath the cooking plate. To meet these requirements, glass ceramic cook tops or hobs are usually set to the values of light transmission from 0.5 to 2.5%. This is achieved by the addition of coloring elements. Glass ceramic cook tops or hobs then appear black when viewed from above, independent of the color element used, due to low light transmission and transparent according to the color-producing elements used, mostly red, violet red or orange brown.

Colored displays consist of light-emitting electronic components, mostly light diodes, which are installed below the cooking surface. They are desired for ease of use and safe operation. Thus, for instance, the current heating power or residual heat of the various cooking zones is indicated optically. The indication of the residual heat is important for the safe handling, especially when the radiator is not emitting or in case of inductive heated cook tops or hobs where in general it is not recognizable if the cooking surface is hot. The usually red LEDs radiate at wavelengths around 630 nm. In order to improve the technical capabilities an also to offer the house equipment manufacturers a possibility for differentiation via the design, in addition to the ordinary red displays also other colored displays are required.

In the infrared a transmission of the cook top or hob of 45-85% is desired.

High transmission in the infrared is advantageous as the radiation impinges directly on the bottom of the cooking pot and is absorbed there so that a faster parboiling will be achieved. When the transmission is too high caused by incorrect operation the surrounding area of the cooking surface can warm up too intense, for instance when a pot was removed from a free radiant cooking zone.

An earlier type of glass ceramic cook tops or hobs, known as Ceran Color®, manufactured by SCHOTT AG, showed good color display capabilities. Ceran Color® is colored by adding of NiO, CoO, $Fe_2O_3$ and MnO refined by $Sb_2O_3$. Through this combination of color oxides a light transmission of typically 1.2% for cook tops or hobs with normal thickness of 4 mm is achieved. The transmission in the range of 380 nm to 500 nm is depending on the wavelength 0.1 to 2.8%. For red LEDs conventional at a wavelength of 630 nm, the transmission is approx. 6%. A disadvantage of this earlier type of glass-ceramic cook tops or hobs is that the color oxides which are used also absorb very strongly in the infrared. IR transmission at 1600 nm is less than 20%. Thus, the parboil speed is reduced. The transmission curve of Ceran® Color is shown in the book "Low Thermal Expansion Glass Ceramics", editor Hans Bach, Springer-Verlag Berlin Heidelberg 1995, on page 66 (ISBN 3-540-58598-2). The composition is listed in the book "Glass-Ceramic Technology, by Wolfram Höland and George Beall, The American Ceramic Society 2002 on Table 2-7.

In the newer, further developed glass-ceramic cook tops or hobs $V_2O_5$ is mostly used for the coloring as it has the special property of light absorbing within the visible range and allows a high transmission within the infrared radiation.

The coloration through $V_2O_5$ is a very complex process. As shown in previous studies (DE 19939787 C2) prerequisite for the transformation of the vanadium oxide into the coloring state is a redox process. In the crystallizable starting glass the $V_2O_5$ still colors relatively weakly and results in a slightly greenish hue. During the ceramization the redox process is proceeds, vanadium is reduced and the redox partner is oxidized. The refining agent functions as primary redox partner. This was shown on Sb- and Sn-refined components by Mössbauer studies. During the ceramization process a part of the $Sb^{3+}$ resp. $Sn^{2+}$ is transferred in the starting glass into the higher oxidation state $Sb^{5+}$ resp. $Sn^{4+}$. It is assumed that vanadium in a reduced oxidation state as $V^{4+}$ or $V^{3+}$ is incorporated in the seed crystal and there dyed intensively by electron charge transfer reactions. As a further redox partner, $TiO_2$ can also strengthen the coloring effect of vanadium oxide. Besides the type and amount of the redox partners in the starting glass also the redox state has an influence which has been set in the glass during the melting process. A low oxygen partial pressure $pO_2$ (melt reducing adjusted) intensifies the coloring effect of vanadium oxide by increasing melting temperatures for example.

A further influence on the color effect of the vanadium oxide is provided by the ceramization conditions.

The particular high ceramization temperatures and longer ceramization times are resulting in a stronger coloration.

The expert will take advantage from the described relations during the coloring process with $V_2O_5$ by using a certain composition of glass, certain redox adjustments of the $pO_2$ during the melt and the ceramization conditions in order to set the required transmission curve. However, up to now, it was impossible to fulfil all the requirements such as light transmission which meets the specifications, high IR transmission, as well as display ability for red LEDs according to standard together with the improved indication or display ability for different colored light displays. The shape of the absorption bands of the vanadium oxide and thus the transmission within the range of the visible light within the entire wavelength range greater than 450 nm to the upper limit of 750 nm could not be adapted to a higher transmission.

Examples for such $V_2O_5$-colored glass-ceramic cook top or hob types are the $Sb_2O_3$-refined Ceran Hightrans® and the $SnO_2$-refined Ceran Suprema®, which are manufactured by company SCHOTT AG. The transmission curves of these two glass-ceramics are published in the book "Low Thermal Expansion Glass Ceramics", Second Edition, Editor Hans Bach, Dieter Krause, Springer-Verlag Berlin Heidelberg 2005, page 63 (ISBN 3-540-24111-6).

The transmission value of 0.1% of the mentioned glass-ceramic cook tops or hobs and other glass-ceramic cooktops available on the market is undergone as far as the visibility of colored, specifically blue and green displays is concerned and therefore also important wavelengths of approx. 450-550 nm. Other essential requirements on the transmission are fulfilled by these glass-ceramic cook tops or hobs such as: high infrared transmission for high parboil speeds, transmission according to specification for standard red light LEDs at approx. 630 nm and a light transmission of about 1.5%.

In order to resolve this disadvantage the European Patent Application EP 1465460 A2 describes a glass-ceramic cook top or hob measured in the CIE color system, with standard light C and showing an Y-value (brightness) of 2.5 to 15, at a thickness of 3 mm. The terms "brightness" and light transmission are actually the same measured quantity. The Y value is identical to the value of the light transmission measured according to DIN 5033. With this light transmission improved displays for blue and green LEDs can be achieved. The disclosed compositions are refined with As$_2$O$_3$ and/or Sb$_2$O$_3$, sometimes in combination with SnO$_2$. The coloring is done by V$_2$O$_5$. In the comparative example it is shown that in case of a light transmission of 1.9% the display capability for blue and green LEDs with the listed material compositions is insufficient. The claimed high values of light transmission of at least 2.5% and preferably higher are disadvantageous as far as to the coverage of the electronic components below the cooking surface is concerned. In addition the black aesthetic appearance of the cooking surface is impaired when viewed from above.

An object of the invention is to provide transparent, colored cook tops or hobs with improved colored display capability and also a method for the manufacture whereby the cook tops or hobs are made of a glass-ceramic with high quartz mixed crystals as prevailing crystal phase up to some unavoidable traces of any of the chemical refining arsenic oxide and/or antimony oxide is contained which is suitable for an economical and environmentally friendly production. Further the starting glasses for an economic production should be easy meltable and refineable, having a high denitrification stability and to be ceramizable within short time intervals. The cook tops or hobs shall be sufficient in view of all further demands required on cook tops or hobs i.e. chemical resistance, temperature resistance and high temperature/long exposure resistance with regard to changes in their properties (such as thermal expansion, transmission, development of mechanical stress).

These objects are realized by a cook top or hob according to claim 1 and by a method according to claim 12.

The colored cooktops feature transmission values exceeding 0.1% in the range of the visible light within the entire wavelength range of greater than 450 nm, a visible light transmission of 0.8 to 2.5% and a transmission in the infrared at 1600 nm of 45-85%.

According to the present invention it is secured by the light transmission of 0.8 to 2.5% that the disturbing visibility of the technical components under the glass-ceramic cook top or hob is prevented and the black aesthetic appearance in top view is guaranteed. Radiant heating elements are visible in operation and the usual visible red LED displays are visible well. The transmission of greater than 0.1% within the range of the visible light in the entire wavelength range from 450 nm also makes different colored displays clearly recognizable. In view of the luminosity of commercially available blue, green, yellow or orange LEDs this transmission value is sufficient and provides a significant improvement in view of the state of the art. Particularly, a display with blue and green colors has been improved considerably. Displays with white light are less distorted in the transmission in the entire wavelength range greater than 450 nm. Below 350 nm, in the range of the ultraviolet, the low transmission values of significantly less than 0.01% of the known glass-ceramic cooking panels are guaranteed even by the cooking panel according to the present invention as well. Blocking of the UV light is beneficial for the protection of organic components such as glue in the technical installations below the cooking panel, as well as protects during the cooking process when blue LEDs with an ultraviolet radiation component are applied for display purposes. By infrared transmission set at 45-85%, measured at 1600 nm, the demands for a high parboil speed and protection against unacceptable heating of the adjacent surface of the cooking panel are achieved. As the values of the transmission and light transmission according to the present invention are decisive for the function of the cook top or hob, they are regarded as independent from the thickness of the cook top or hob which is usually ranging between 2.5 and 6 mm. Smaller thicknesses are disadvantageous in terms of strength and higher thicknesses are inefficient as they require some more material and are reducing the ceramization speed. Mostly, the thickness of the cooking panel is about 4 mm. The transmission values indicated for commercial cooking panels and also as given in the examples are relating to this thickness provided there is no other value mentioned. When the cooking panel is made by shape forming with rollers, mostly the bottom is provided with knobs to protect them against strength reducing damage during manufacturing. Often the bottom of the cook top or hob within the zone of the colored displays is smoothened by transparent organic polymer in order to avoid optical distortion caused by the knobs. At cook tops or hobs with a smooth bottom and without knobs the colored displays are undistorted and seen more brightly.

To comply with the demand for the temperature resistance the cooking panels feature according to the present invention low thermal expansion coefficients less than 1·10$^{-6}$/K, preferably of (0±0.3)·10$^{-6}$/K.

According to the present invention the transparent, colored cooking panels are characterized through a composition without the use of arsenic and/or antimony oxide as refining agent and thus they are technically free of these under safety and environmental protection aspects adverse components. Normally these components are impurities present in amounts of less than 500 ppm.

The inventive method for producing a transparent, dyed cooking panel with improved color display capability is characterized by forming a glass-ceramic with high quartz mixed crystals as predominant crystal phase and that except of some unavoidable traces the chemical refining agent arsenic and/or antimony oxide can be or is avoided and the transmission values of the cook top or hob are set greater than 0.1% within in the entire wavelength range of the visible light greater than 450 nm, set to a light transmission in the visible from 0.8 to 2.5% and set to a transmission in the infrared at 1600 nm from 45 to 85%.

In order to improve the blister quality besides the applied SnO$_2$ in addition further refining agents such as CeO$_2$, sulfate compounds, halide compounds can be applied. The contents thereof are usually limited to quantities of 1 weight %. During the production of cooking panels numbers of bubbles less than 10 are considered as good blister qualities, preferably less than 5 bubbles/kg of glass (based on bubble sizes larger than 0.1 mm) are preferred.

The transmission of the cooking panel or cook top or hob with the following values is preferably set as shown below
>0.15% at 450 nm
>0.15% at 500 nm
>0.25% at 550 nm
3-9% at 630 nm
50-80% at 1600 nm
and a light transmission in the visible range of 1.0-2.0%.

At these values the color display capability has been further improved and the various demands on the transmission spectra can be further optimized. A further improved coverage of the technical installations underneath the glass-ceramic cook tops or hobs and a particularly aesthetic appearance of black in reflected light will be achieved when the light transmission is less than 1.7%. Transmission values of the cooktop surface at 630 nm of 3 up to 9% comply with the tolerances of commercially available cook tops or hobs. It is advantageous to adjust these values so that the appearance of the usual red LED displays remains unchanged too at the cooking surface according to the present invention of cook tops or hobs.

The displays ability is further improved if the preferred embodiment of the transmission of the cooktop surface is set to values of
>0.10% at 400 nm
>0.15% at 450 nm
>0.25% at 500 nm
>0.30% at 550 nm
3-9% at 630 nm
50-80% at 1600 nm
and a light transmission in the visible range of 1.0-1.7%.

For the cook top or hob, which also is termed cooking surface here, according to the present invention a composition of the glass-ceramic is preferred in weight % on an oxide basis essentially consisting of:

| | |
|---|---|
| $Li_2O$ | 3.0-4.2 |
| $\Sigma\ Na_2O + K_2O$ | 0.2-1.5 |
| MgO | 0-1.5 |
| $\Sigma\ CaO + SrO + BaO$ | 0-4 |
| ZnO | 0-2 |
| $B_2O_3$ | 0-2 |
| $Al_2O_3$ | 19-23 |
| $SiO_2$ | 60-69 |
| $TiO_2$ | 2.5-4 |
| $ZrO_2$ | 0.5-2 |
| $P_2O_5$ | 0-3 |
| $SnO_2$ | 0.1-<0.6 |
| $\Sigma\ TiO_2 + ZrO_2 + SnO_2$ | 3.8-6 |
| $V_2O_5$ | 0.01-0.06 |
| $Fe_2O_3$ | 0.03-0.2 | and $1 < Fe_2O_3/V_2O_5 < 8$.

The term "essentially consists of" means that the components listed are at least 96%, however, generally should be 98% of the total composition. A plurality of elements such as F, Cl, alkalis Rb, Cs or elements like Hf are common impurities in the industrially used mixture of raw materials. Other compounds for example such as the elements Ge, rare earths, Bi, W, Nb, Ta and Y can be added in small amounts.

Besides the $V_2O_5$ color oxide in amounts of 0.01 to 0.06 weight % further components such as coloring chromium, manganese, cobalt, nickel, copper, selenium, rare earth, molybdenum compounds can be used in order to support the dyeing. Their content is limited to quantities of maximum ca. 1 weight % because these compounds generally lower the transmission in the infrared. Furthermore these largely polyvalent compounds can interfere with the coloring of $V_2O_5$ via redox reactions and complicate the setting of the transmission.

By addition of 50-400 ppm $Nd_2O_3$ it is possible to mark the glass ceramic cook top or hob. The absorption band of Nd in the near infrared at 806 nm is within a range of high transmission values of the glass-ceramics and is so distinctive in the transmission spectrum. Thereby the cook top or hob material can safely be assigned to the manufacturer and by optical shard detection methods good recycling is possible.

The water content of the starting glasses for the production according to the present invention of the cook tops or hobs is dependent on the choice of the mixture of raw materials and process conditions during the melt usually between 0.015 and 0.06 mol/l. This meets β-OH-values of 0.16 to 0.64 $mm^{-1}$ for the initial glasses.

The oxides $Li_2O$, $Al_2O_3$ and $SiO_2$ in the preferred indicated limits are necessary components of the high quartz mixed crystals. A minimum content of $Li_2O$ of 3 weight % is required, however, $Li_2O$-contents exceeding 4.2 weight % during a manufacturing process are often resulting in an unintentionally devitrification. A content of 3.2-4.0 weight % leads to particularly suitable results.

To avoid high viscosity of the starting glass and for suppression of the tendency to an undesirable devitrification of mullite during the shaping the $Al_2O_3$ content is preferably limited to a maximum 23 weight %, especially, 22 weight % in particular. The $SiO_2$ content shall be 69 weight % as maximum value as this component increases the viscosity of the glass considerably. Preferably, this component will be further limited to a value of a maximum of 68, or even 67 of by weight %.

For good melting results of the glasses and low forming or molding temperatures, higher contents of $SiO_2$ are uneconomical. The minimum content of $SiO_2$ shall be 60 weight %, preferably 62 weight %, as this is advantageous for the demanded cooking surface properties such as chemical resistance and temperature resistance.

Further components such as MgO, ZnO and $P_2O_5$ can be added into the high quartz mixed crystals. Due to its problematic forming of unwanted crystal phases such as zinc-spinel (Gahnite), the ZnO content during the ceramization process is limited to values of maximum 2.0 weight %, preferred is a maximum of 1.8 weight %. The MgO content is limited to a maximum of 1.5 wt-%, preferred is a maximum of up to 1.2 weight % as it otherwise would increase the expansion coefficient of the glass-ceramic inadmissibly. Generally, a minimum content of MgO of 0.1 weight % is required so that the thermal expansion of the glass ceramic does not descend to negative values.

The addition of alkalis $Na_2O$, $K_2O$ and the alkaline earths as well as CaO, SrO, BaO and $B_2O_3$ improve the fusibility and denitrification stability during the shaping of the glasses. However, the contents must be limited, as these components cannot be incorporated in the crystal phases, but essentially remain in the residual glass phase of the glass-ceramic. Excessive contents increase the thermal expansion of the glass ceramic in an inadmissible way and affect the crystallization behavior during the transformation of the crystallizable initial glass into glass-ceramic, in particularly at the expense of fast ceramization. In addition, higher contents have a negative affect on the time/temperature load capacity of the glass-ceramic. The sum of the alkalis $Na_2O+K_2O$ should be at least 0.2, preferably at a minimum of 0.4 weight % and a maximum of 1.5 weight %, preferred is a maximum of 1.2 weight %.

The sum of the alkaline earths CaO+SrO+BaO should be at a maximum of 4 weight %, preferred is a minimum of 0.2 weight %. The mentioned alkali and alkaline earth metals do not only concentrate in the residual glass phase between the crystals but also on the surface of the glass ceramic. During the ceramization, a thick glassy surface layer of approx. 200 to 1000 nm is developing which is almost free of crystals, enriched in these elements and depleted of lithium. This glassy surface layer has a favorable effect on the chemical resistance of the glass ceramic.

The addition of $P_2O_5$ can be up to 3 weight % and is preferably limited to 1.5%. The addition of $P_2O_5$ is favorable for the devitrification resistance. Higher levels show an unfavorable effect on the acid resistance.

$TiO_2$, $ZrO_2$ and $SnO_2$ are required as nucleating or seed agents. At the ceramization process during the nucleation seed crystals of a high density are produced which for the growth of the high quartz mixed crystals are acting as surface during the crystallization procedure. Higher levels than in a sum of 0.6 weight % deteriorate the devitrification stability. This is valid especially for the component $SnO_2$ which is limited to values of less than 0.6 weight %. Higher concentrations lead to the crystallization of Sn-containing crystal phases at the contact materials (e.g. Pt/Rh) in the shaping processes and are absolutely avoided. The $ZrO_2$ content is limited to 2 weight %, preferred is 1.8 weight % and is further preferably limited to a maximum of 1.6 weight % as higher contents are deteriorating the melt down behavior of the mixture during the glass production and the devitrification stability at the shaping due to the forming of $ZrO_2$-containing crystals may be influenced strongly. The minimum content of $ZrO_2$ is 0.5-weight % and preferably should be 0.8 weight % in order to favor a high ceramization speed. The $TiO_2$ content is between 2.5 and 4.0 weight %, preferably at least 2.8 weight %. The minimum amount should not be lowered, so that a fast nucleation for achieving higher ceramization speeds will be ensured. The content should not exceed 4 weight % otherwise the devitrification stability will be deteriorated.

Surprisingly it was found now that the $Fe_2O_3$ contents from 600 ppm, preferred from 700 ppm in combination with tightly specified contents of $TiO_2$, $V_2O_5$ and $SnO_2$ can influence the course of transmission, i.e. the transmission spectra. Since $Fe_2O_3$, specifically the proportion of divalent $Fe^{2+}$ adversely affects the IR transmission, the $Fe_2O_3$ content should be maximum 0.2 and preferably 0.18 weight %. Particularly preferred is a $Fe_2O_3$ content of 0.08-0.15 weight %. The combination of color oxides $Fe_2O_3$ with $V_2O_5$ and its redox partner $SnO_2$ allows getting along with smaller quantities of the costly and as hazardous classified dye $V_2O_5$. Though, the requirements on the transmission at low wavelengths from 450 nm and the further demands such as light transmission which meets the specification, infrared transmission, and the transmission as well are being kept at 630 nm. The transmission curve compared to the well-known colored glass ceramics colored with vanadium oxide are getting flatter within the range of visible light. In order to reduce the content of the expensive and also as hazardous substance not harmless colorant $V_2O_5$ it is indispensable that the $Fe_2O_3$ content must be at least as high as the $V_2O_5$ content and thus meet the condition $1 < Fe_2O_3/V_2O_5 < 8$.

The coloring oxide So $Fe_2O_3$ is quantitatively the main colorant and preferred is the content twice as high as that of the $V_2O_5$. Therefore it is also possible to use cheaper raw material mixtures. Other components which contribute to reduce the $V_2O_5$ content are $SnO_2$ and $TiO_2$. For the setting of the transmission according to the present invention, it is therefore necessary to adjust $V_2O_5$, $SnO_2$, $TiO_2$ and $Fe_2O_3$ within certain close limits. In particular, the $TiO_2$ content must exceed a certain minimum quantity.

Based on the $Fe_2O_3$, $TiO_2$, $V_2O_5$ and $SnO_2$ contents according to the present invention, it is possible to meet all the requirements related to the transmission spectra, such as the specified light transmission, high infrared transmission, and display capability for standard red LEDs together with the desired improved display capability for different colored LED displays.

As further important result of the addition of $Fe_2O_3$, it was found out that this is supporting refining essentially. In combination with the $SnO_2$ refining agent, also the $Fe_2O_3$ delivers oxygen and is thereby reduced to $Fe^{2+}$. The significant reaction for the refining effect increases with the temperature of the melt. A temperature treatment of the melt at temperatures greater than 1700° C. and then greater than 1750° C. thus provides with regard to the blister quality further improved results. In order that the addition of $Fe_2O_3$ as an supplementary refining agent in combination with $SnO_2$ turns out considerably advantageous, the content should be at least 20% of the $SnO_2$ content.

For an economic production, a fast ceramization of the starting glass is required. In this process it is necessary to increase the nucleation and ceramization speed by a suitable chosen composition. Here, it has proven to be advantageous to increase the concentrations of the nucleating agents $TiO_2+ZrO_2+SnO_2$ in order to raise the nucleation speed while the content of $P_2O_5$ must be chosen at lower values. Furthermore, distortions occurring during the ceramization of the cooktop surfaces are a limiting factor. Large-scale ceramization ovens show a certain temperature inhomogeneity and therefore, it is difficult to set the temperature at the top and bottom of the crystallizable glass during the crystallization completely equally. Slight differences in temperature of a few ° C. lead to earlier crystallization on the cook top or hob side with the higher temperature. Coherent with the linear crystallization shrinkage of about 1% then distortions will occur. Usually, commercial cooking surfaces are specified to a distortion of less than 0.1% of their diagonal dimension.

In order to minimize this distortion during a fast ceramization program, it has turned out favorably to minimize the percentage of crystal phase forming components such as $Li_2O$, $SiO_2$ and the proportion of components which make up the residual glass phase of the glass-ceramic, such as the alkalis $Na_2O$ and $K_2O$, and the Alkaline earths CaO, SrO, BaO as well. The proportion of high-quartz mixed crystal phase is advantageously less than 70 weight.-% and is around 60 to 70 weight %. During the ceramization, the glass ceramic panel lies on a flat base plate. Resulting from the increased proportion of residual glass phase and the reduction of the crystal phase share distortions which occurred during viscous flow at high temperatures are reduced as the glass ceramic panel is layed down on the flat base plate.

Preferably, the inventive cooktop surface features with regard to a faster ceramization ability of the starting glass a composition of the glass ceramics which in weight % on an oxide basis is consists of:

| | |
|---|---|
| $Li_2O$ | 3.2-4.2 |
| $Na_2O$ | 0.1-1 |
| $K_2O$ | 0.1-1 |
| $\Sigma\ Na_2O + K_2O$ | 0.2-1.5 |
| MgO | 0-1.5 |
| $\Sigma\ CaO + SrO + BaO$ | 0.1-4 |
| ZnO | 0-2 |
| $B_2O_3$ | 0-1 |
| $Al_2O_3$ | 19-23 |
| $SiO_2$ | 60-68 |
| $TiO_2$ | 2.8-4 |
| $ZrO_2$ | 0.8-1.8 |
| $P_2O_5$ | 0-1.5 |
| $SnO_2$ | 0.1-<0.6 |
| $\Sigma\ TiO_2 + ZrO_2 + SnO_2$ | 4.4-6 |
| $V_2O_5$ | 0.01-0.05 |
| $Fe_2O_3$ | 0.07-0.18, | with the requirement $< Fe_2O_3/V_2O_5 < 6$.

It is understood that a fast ceramization ability is a thermal treatment for crystallization of the glass-ceramic with a duration of less than 2 hours, however, less than 80 minutes are preferred.

At the process for ceramization according to the invention, the thermally relaxed crystallizable starting glass is heated up to a temperature range of about 680° C. within 3-30 min. The required high heating rates can be realized in large-scale roller furnaces. This temperature range of about 680° C. corresponds approximately to the transformation temperature of the glass. Above this temperature up to about 800° C. is the range with high nucleation rates. The temperature range of nucleation is passed through a period of 10 to 30 minutes. Then the temperature of the glass containing the crystal nuclei is increased within 5 to 30 minutes up to a temperature of 850 to 950° C. which is characterized by high crystal growth rates of the high quartz mixed crystal phase. This maximum temperature is maintained up to 20 minutes. Thereby the structure of the glass-ceramic homogenizes and the optical, physical and chemical properties are set. The resulting glass-ceramic is cooled down to 800° C. by cooling rates of about 10° C./min and then rapidly cooled down to room temperature.

Raw materials, e.g. barium nitrate or barium chloride used as a source for the BaO are environmentally detrimental and require special precautions when applied. Furthermore, BaO increases the density of the glass-ceramic and therewith the weight of the cook top. To reduce the BaO content or thus, except of impurities removing it completely, it has turned out advantageously to substitute BaO by the chemically similar alkaline earths CaO and SrO. In this case the contents of CaO should be 0.2 to 1 weight % and of SrO 0.1 to 1 weight %.

For an economical manufacturing, the crystallizable starting glass should be easily meltable and show a high devitrification resistance. The processing temperature (VA) should be less than 1320° C. and preferably lower than 1310° C. The upper devitrification limit should be at least 30° C., preferably at least 50° C. below the processing temperature at least. Regarding the devitrification, critical crystal phases are mullite (aluminum silicate), Baddeleyt ($ZrO_2$) and $Li_2O$—$Al_2O_3$—$SiO_2$ mixed crystals as well as $SnO_2$ containing crystal phases. In view of the devitrification resistance, higher levels of $Li_2O$, $Al_2O_3$, $SiO_2$, $ZrO_2$ and $SnO_2$ are unfavorable. To decrease the viscosity of the molten glass it has proved necessary to reduce the content of $SiO_2$, $Al_2O_3$, $ZrO_2$, while the levels of alkalis $Na_2O+K_2O$, alkaline earths CaO+SrO+BaO are used at higher values.

Preferably in this regard, according to the present invention a cooking surface has the following composition in weight % on oxide basis:

| | |
|---|---|
| $Li_2O$ | 3.2-4.0 |
| $Na_2O$ | 0.2-1 |
| $K_2O$ | 0.1-1 |
| $\Sigma Na_2O + K_2O$ | 0.4-1.2 |
| MgO | 0.1-1.2 |
| CaO | 0.2-1 |
| SrO | 0-1 |
| BaO | 0-3 |
| $\Sigma$ CaO + SrO + BaO | 0.2-4 |
| ZnO | 0-1.8 |
| $B_2O_3$ | 0-1 |
| $Al_2O_3$ | 19-22 |
| $SiO_2$ | 62-67 |
| $TiO_2$ | 2.8-4 |
| $ZrO_2$ | 0.5-1.6 |
| $P_2O_5$ | 0-1.5 |
| $SnO_2$ | 0.1-0.5 |
| $\Sigma TiO_2 + ZrO_2 + SnO_2$ | 4.2-6 |
| $V_2O_5$ | 0.01-0.05 |
| $Fe_2O_3$ | 0.08-0.15 | with:

$$2 < Fe_2O_3/V_2O_5 < 6.$$

It has shown that reduced conditions of the crystallizable starting glass which are set targeted and performed during the melting process show a beneficial effect on the desired transmission spectra of the glass-ceramic. The different demands mentioned for the transmission can then be met easier. The equilibrium oxygen partial pressure $pO_2$ of 1 bar should be achieved at a temperature of >1580° C. preferably 0f >1640° C. The higher this temperature is, the more reducing is the resulting adjusted glass and the content of lower valences of the polyvalent components such as $Sn^{2+}$, $Fe^{2+}$ are $Ti^{3+}$ are increased. This enhances the color effect of the vanadium oxide.

At the inventive temperatures for the equilibrium oxygen partial pressure $pO_2$ it is possible to adjust the transmission curve of the invention by lower $V_2O_5$ contents. Less than 0.04 and preferably less than 0.03 weight % is needed. Since vanadium is also an expensive raw material it is economically advantageous to minimize the content of $V_2O_5$.

This equilibrium oxygen partial pressure $pO_2$ can be set during the melt based on addition of reducing agents in powder and/or liquid form to the starting mixture. Suitable for this purpose are metals, carbon and/or oxidizable carbon or metal compounds, e.g. Al or Si-powder, sugar, charcoal, SiC, TiC, MgS, ZnS. Also gaseous reducing agents are suitable, e.g. forming gas. The mentioned reducing agents are suitable for decreasing the $pO_2$ of the melt and to adjust the desired value for the equilibrium oxygen partial pressure.

A preferred method to adjust the equilibrium oxygen partial pressure $pO_2$ is the temperature treatment of the glass melt at temperatures above 1700° C., preferably greater than 1750° C. This temperature treatment can advantageously be performed at high temperature refining which allows to achieve the desired low numbers of bubbles of <10, preferably <5 bubbles/kg on a large scale. The refining effect is so significant as $SnO_2$ is a refining agent which increases the release of the required oxygen for the refining at high temperatures above 1700° C. This also is true for the additional refining agent $Fe_2O_3$. The combination of the both thus provides further improved bubble qualities, and/or allows higher glass throughputs in industrial glass melting vessels. The contribution of $Fe_2O_3$ for refining will be significant at contents of at least 20 weight % of the applied refining agent $SnO_2$. Thus, one can combine the advantage of a good refining effect together with the advantage of the invention by setting of the equilibrium oxygen partial pressure $pO_2$ to the preferred value. This mechanism forms at high temperatures $O_2$ refining bubbles which rise in the glass melt and leave it, whereby other dissolved further gases are also removed. If sufficient time is given so that all during the refining released oxygen has been removed from the melt, the temperature at which the equilibrium oxygen partial pressure $pO_2$ shows the value of 1 bar complies with the maximum temperature during the treatment. Since this equilibrium in the industrial glass melting processes and the flow rates used due to reasons of time cannot be fully achieved, always a certain amount of oxygen refining bubbles remain in the melt and will be absorbed during the cooling. Furthermore, in a small amount, oxygen is absorbed again from the environment during the cooling process of the melt starting from the maximum temperature down to the forming or molding temperature VA. As a result thereof, the measured temperature of the equilibrium oxygen partial pressure $pO_2$ of 1 bar does not comply with the maximum temperature in the melt, but is less. Unless reducing additives are added.

Preferably, below the cooking surface of the present invention with improved color display capability instead of or in addition to the usual red LEDs or displays one or more different colored LEDs, like blue, green, yellow, orange or white are arranged. The colored displays consist of light-emitting electronic components, usually made of LEDs. The bottom of the cooktop surface can either be equipped with the traditional knobs or in a smooth design.

The heating of the cooking surface can be accomplished by radiation heaters, halogen heaters, induction heating or gas. All types of displays e.g. point-like or two-dimensional are possible.

The cooking surface can not only be formed as a flat panel, but also shaped three-dimensionally as for instance bent, angled or curved panels can be used. The panels may be available in right angles or other forms as well as besides flat areas also three-dimensionally shaped areas such as Woks for example.

The present invention is further explained by means of the following examples:

In Table 1 compounds and properties of the crystallizable starting glasses are listed.

The glasses 1 to 12 are glasses according to the present invention and glass 13 is a comparison of a glass which is beyond of the present invention which meets the composition of the commercial glass-ceramic cook tops or hobs Ceran Suprema® from SCHOTT AG. Because of typical impurities in the large-scale mixture of raw materials the compositions do not exactly add to 100 weight %. Typical impurities even if they are not intentionally put into the composition are F, Cl, B, P, Rb, Cs, Hf which are typically less than 0.05 weight %. Often, these have been introduced by means of the raw materials for the chemically related components such as Rb and Cs by means of Na and/or K raw materials or Sr by means of the Ba raw material and vice versa.

The water content of the glasses is 0.03 to 0.05 mol/l, according to βOH-values of 0.32 to 0.53 $mm^{-1}$.

Also the properties in the glassy state, such as transformation temperature Tg, processing temperature VA, devitrification temperature and the density are listed in Table 1. In glasses of the same composition even if the refining temperature was varied these properties remain the same.

To measure the devitrification temperature, the glasses are melted in Pt/Rh10-crucibles. Subsequently, the crucibles are kept for 5 hours at various temperatures within the range of the processing temperature VA. The topmost temperature at which the first crystals occur on the contact surface of the glass melt towards the crucible wall determines the devitrification temperature.

Furthermore, the maximum temperature of the melt and therewith associated time, as well as the measured temperature at which the $pO_2$ reaches the value of 1 bar are listed in Table 1. The $pO_2$ measurement was performed in a known manner at the re-molten glass as a function of the temperature and the temperature for the equilibrium oxygen partial pressure $pO_2=1$ bar was determined. In $pO_2$ measurements, $pO_2$ is a function of the temperature and reversibly dependent therefrom as long as no oxygen has been exchanged with the environment.

FIG. 1 shows the measurement of $pO_2$ (T) for glass no. 9 and the determination of the characteristic temperature T ($pO_2=1$ bar). Since the glass melt at high temperatures close to the temperature of the equilibrium oxygen partial pressure T($pO_2$ bar=1) has already started to deliver oxygen to the environment, this means that the value of this characteristic temperature is changed. Therefore, during measurement the temperature of the glass was increased up to about 40° C. below the characteristic temperature T($pO_2=1$ bar) and the value was determined by extrapolating the measured straight line log $pO_2$ proportionally to 1/T (see FIG. 1).

The starting glasses of Table 1 had been melted with conventional raw materials as commonly used in the glass industry at temperatures of about 1620° C. for 4 hours. After melting of the mixture in crucibles made of sintered silica glass, the melts were transferred into Pt/Rh crucibles with an inner crucible made of silica glass and homogenized at temperatures of 1550° C. by stirring for 30 minutes. After this homogenization, different temperature treatments for refinement had been performed. The maximum melting and/or refining temperatures and times are stated in Table 1.

The glasses no 2, 3, 5, 6, 8, 10, 11, 13 have been refined for 2 hours at 1640° C. Thereafter, pieces of approx. 140×100×30 $mm^3$ in size had been formed.

The glasses 1, 4, 7, 9, 12 and the comparative glass were subjected to a high temperature refinement at temperatures and times as stated in Table 1 in order to achieve good bubble qualities and to adjust reducing conditions according to the specified temperature T($pO_2=1$ bar). Before pouring out the refined molten glass, the temperature was lowered to about 1700° C. In order to avoid tension in a cooling oven, the casted glasses were cooled down to room temperature starting at a temperature of about 20° C. below the transition temperature of the glasses. From these molded pieces, the test samples for the measurements were prepared.

The positive influence of high temperature refining with regard to the bubble quality is also reflected even at the laboratory melts. The absolute values of the number of bubbles in the laboratory melts are for technical reasons (different surface to volume ratio in laboratory melts) within a range which is above those of a large-scale melts. The relative differences are meaningful. Conventionally at around 1640° C. refined melts show approximately 1000-5000 bubbles/kg of glass, however, show at high-temperature refining approximately 200-2000 bubbles/kg. Based on the same composition, the high-temperature refining provides better values. In a large scale process, based on these values, the desired qualities of less than 10 bubbles/kg of glass can be achieved.

The glasses 1, 2, 3 as well as 7, 8 and 9, 10 had the same compositions, however, had been melted in different ways. Glass 1 was subjected to a high temperature refining process. Glass 3 was adjusted to a more reduced state by addition of 1 weight % of sugar to the starting mixture as compared to glass 2 which was refined at the same temperatures. Therefore, the temperatures for the equilibrium oxygen partial pressure are different. Due to the therewith associated, different, reducing conditions of the crystallizable starting glasses under the same conditions, however, the transmission values of the obtained glass ceramics are different. At low maximum temperatures of the melt, higher levels of $V_2O_5$ or higher ceramizing temperatures are required in order to obtain equal transmission values.

After refining and standing at 1600° C., for 50 h in a 14 l containing Pt/Rh10-crucible, the glasses 1, 4, the comparative glass 12, and also pieces of the commercially produced glass-ceramic Ceramic Color® were shaped into cooktop-typical panels with a laboratory rolling installation. The laboratory rollers consisted of shortened original production rollers. The lower roller was structured for the production of a conventional knobbed cooking surface bottom side. From the obtained glass band of about 200 mm width, 4 mm thickness and 2 m length after cooling in order to reduce tension, the test samples had been prepared for the measurements, and panels of dimensions 18 cm×18 cm×4 mm for the tests of the flatness at a fast ceramization process. The panels had been placed in a laboratory furnace with homogeneous, controllable upper and lower heat and ceramized on a flat ceramic base plate. It was heated at 10° C./min up to 750° C., holding time 15 min. Then, the heating was continued at 4° C./min up to 900° C., holding time 15 min and rapidly cooled down to room temperature. Throughout the whole program, the upper temperature in the furnace compared to the lower surface, was increased by 6° C. Thus, the ceramic plates were intentionally deformed in a dome-shaped manner. The deviation from flatness for reference glass no. 13 was 2.1±0.2 mm (6 tests), Ceramic Color® at 0.6±0.1 mm (4 tests) and in glass no. 1 and no. 4 for both 0.5±0.1 mm (3 tests). As it has been shown that the on a large scale produced glass-ceramic material ceramic Color® is able to ceramize with the required flatness within less than 80 min, this is also valid for the glasses according to the invention based on the experimental relative comparison.

Table 2 shows the ceramization conditions and properties of the obtained glass-ceramics and ceramics 2, 4, 17 for comparison. The ceramization of the starting glasses was carried out by the following time/temperature programs, the values of $T_{max}$ and $t_{max}$ are shown in Table 2:

Ceramization Program 1:
a) heating up within 15 minutes from room temperature to 680° C.;
b) raising temperature from 680 to 800° C. within 34.5 min, through heating at 10° C./min to 750° C., holding time of 15 min at 750° C., heating at 4° C./min to 800° C.;
c) raising temperature from 800° C. to Tmax and holding time tmax min at a heating rate 4° C./min;
d) cooling to 800° C. at 10° C./min, then rapid cooling to room temperature.

Ceramization Program 2:
a) heating within 5 minutes up from room temperature to 680° C.;
b) increase in temperature from 680 to 800° C. within 19 min by heating at 10° C./min to 730° C., further heating at 5° C./min up to 800° C.;
c) raising the temperature from 800° C. to $T_{max}$ and holding time $t_{max}$ with a heating rate of 5° C./min;
d) cooling down to 800° C. with 10° C./min, then rapid cooling to room temperature.

Concerning samples 2 and 4 of the comparison glass-ceramics, the $PO_2$ values set in the starting glass do not reveal the light transmission according to the invention. This proves compared to example 1 the influence of the redox state set, since the samples were produced under the same ceramization conditions. This can be corrected by adjustment of the ceramization conditions. (example 3 and 5). The starting glasses nos. 1, 2 and 3 of the examples 1 to 5 have the same composition and there is only a difference in redox state which was set during the melting process.

The values for a mean crystallite size and the portion of high-quartz mixed crystal phase were determined by x-ray diffraction. The examples have due to their content of high-quartz mixed crystals as predominant crystal phase, the desired very low values of thermal expansion measured within the temperature range between room temperature and 700° C. The characteristic values of the invention for the transmission at different wavelengths, and also for the light transmission, with latter has the same meaning as "brightness" Y, are listed in the table. The values of the panels were determined on polished plates with the typical cooking surfaces' thickness of 4 mm. The optical measurements were made by means of standard light C, 2 degrees.

Figure 2A:
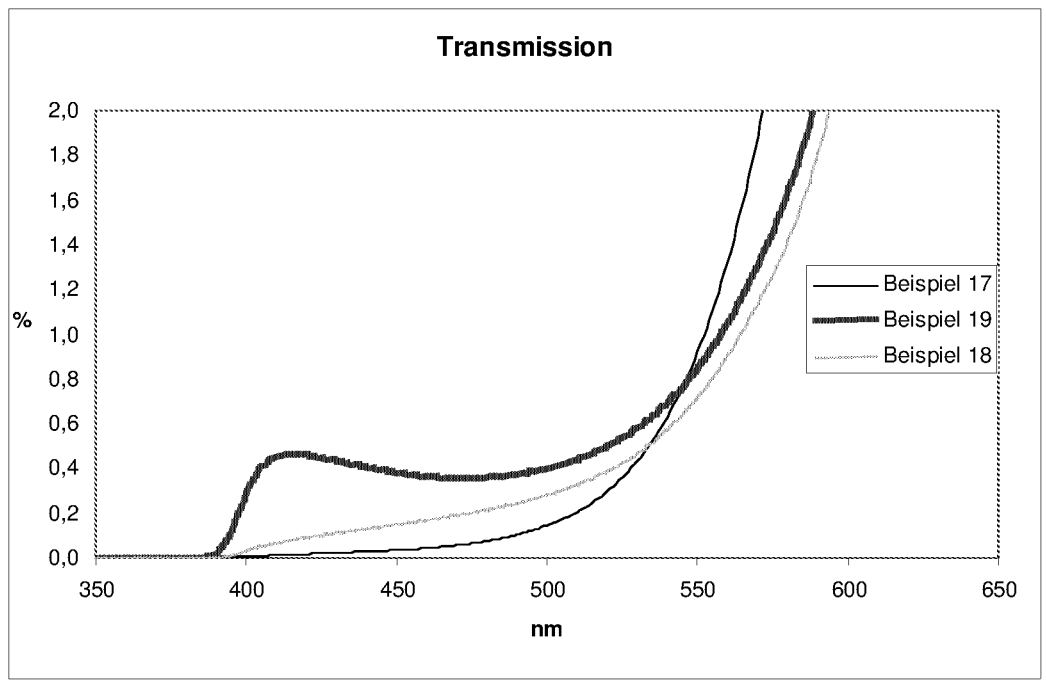
FIG. 2A and FIG. 2B provide graphs showing the transmission spectra of glass ceramics according to the present invention.
Figure 2B:
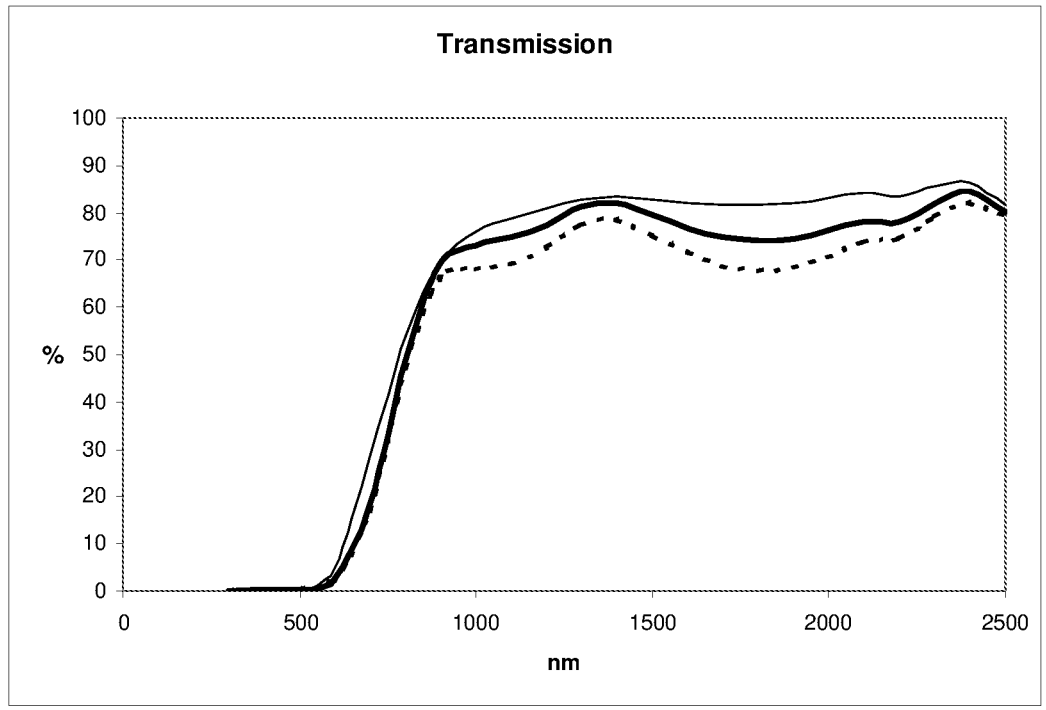

In an additional example no. 18 a composition according to glass no. 1 was melted on a large scale and by high-temperature refining at approx. 1770° C. for 15 min, a temperature was set for the equilibrium oxygen partial pressure pO2=1 bar to 1610° C. The bubble quality of this glass was excellent and it was <3 bubbles/kg of glass. During the forming process, a ribbon having knobs of 4 mm thickness was produced and in order to avoid stress, cooled in a cooling or annealing oven. From this glass ribbon cooking surfaces in a size of 500×500×4 mm were cut and ceramized in an industrial roller oven. The ceramization program corresponded to program 2 (Table 2) and the crystallizable glass panels were put on a flat ceramic base plate. The received glass-ceramics had a very good flatness of less than 0.1% in their diagonal sizes. The transmission curve of this glass-ceramic according to the invention in FIG. 2 is faced against the comparative glass-ceramic of example 17 and the inventive example of 19. Within the wavelength range in the visible light of 400 to 600 nm which is essential for the invention, the advantageous transmission curve of the inventive glass-ceramic for the increased display capability shows values at above 0.1%, and the good UV-blocking below 350 nm.

TABLE 1

Compositions and Characteristics of the Present Invention Starting Glasses and Comparison Glass 13

| | Glass No. | | | | | | |
|---|---|---|---|---|---|---|---|
| | 1 | 2 | 3 | 4 | 5 | 6 | 7 |
| Compositions in Weight - % on Oxide Basis | | As Glass No. 1 | As Glass No. 1 | | | | |
| $Al_2O_3$ | 20.8 | | | 20.9 | 21.0 | 20.90 | 21.7 |
| BaO | 2.19 | | | 2.26 | 0.97 | 1.48 | 1.01 |
| CaO | 0.44 | | | 0.46 | 0.40 | 0.40 | 0.13 |
| $K_2O$ | 0.24 | | | 0.20 | 0.25 | 0.30 | 0.22 |
| $Li_2O$ | 3.61 | | | 3.64 | 3.52 | 3.48 | 3.73 |
| MgO | 0.34 | | | 0.31 | 0.31 | 0.40 | 0.72 |
| $Na_2O$ | 0.58 | | | 0.62 | 0.45 | 0.50 | 0.33 |
| $P_2O_5$ | — | | | — | — | — | — |
| $SiO_2$ | 65.2 | | | 64.9 | 66.70 | 66.10 | 65.3 |
| $SnO_2$ | 0.24 | | | 0.24 | 0.24 | 0.24 | 0.27 |
| SrO | 0.10 | | | — | — | — | — |

TABLE 1-continued

Compositions and Characteristics of the Present Invention Starting Glasses and Comparison Glass 13

| | | | | | | | | |
|---|---|---|---|---|---|---|---|---|
| $TiO_2$ | | 3.11 | | | 3.27 | 3.23 | 3.26 | 3.20 |
| ZnO | | 1.52 | | | 1.50 | 1.38 | 1.36 | 1.60 |
| $ZrO_2$ | | 1.38 | | | 1.37 | 1.26 | 1.31 | 1.48 |
| CoO | | — | | | 0.039 | 0.069 | 0.065 | 0.039 |
| $Fe_2O_3$ | | 0.12 | | | 0.12 | 0.15 | 0.15 | 0.12 |
| $MnO_2$ | | 0.020 | | | 0.028 | — | — | 0.028 |
| $Nd_2O_3$ | | 0.015 | | | — | | | |
| NiO | | — | | | 0.013 | — | — | 0.012 |
| $V_2O_5$ | | 0.024 | | | 0.024 | 0.037 | 0.042 | 0.025 |
| Addition Mixture | Weight-% | | | 1 (Sugar) | | | | |
| Characteristics | | | | | | | | |
| Tg | °C. | 673 | | | 666 | 679 | 678 | 671 |
| $V_A$ | °C. | 1306 | | | 1303 | 1327 | 1318 | 1296 |
| Density | g/cm³ | 2.478 | | | 2.480 | 2.448 | 2.460 | 2.468 |
| Devitrification Temperature | °C. | 1255 | | | 1260 | 1265 | 1265 | 1290 |
| T ($pO_2$ = 1 bar) | °C. | 1643 | 1582 | 1798 | 1654 | 1608 | 1617 | 1664 |
| Maximum temp. | °C. | 1850 | 1640 | 1640 | 1850 | 1640 | 1640 | 1850 |
| Melt, time | h | 1 | 2 | 2 | 1 | 2 | 2 | 1 |

| | | Glass No. | | | | | |
|---|---|---|---|---|---|---|---|
| | | 8 | 9 | 10 | 11 | 12 | 13 |
| Compositions in Weight - % on Oxide Basis | | As Glass No. 7 | | As Glass No. 9 | | | |
| $Al_2O_3$ | | | 19.1 | | 21.0 | 20.9 | 21.2 |
| BaO | | | 0.77 | | — | 2.30 | — |
| CaO | | | 0.05 | | 0.5 | 0.42 | — |
| $K_2O$ | | | 0.13 | | 0.4 | 0.22 | 0.15 |
| $Li_2O$ | | | 3.59 | | 3.7 | 3.71 | 3.8 |
| MgO | | | 1.16 | | 0.4 | 0.37 | 1.0 |
| $Na_2O$ | | | 0.14 | | 0.6 | 0.59 | 0.45 |
| $P_2O_5$ | | | — | | 0.6 | — | — |
| $SiO_2$ | | | 68.6 | | 65.8 | 65.14 | 67.2 |
| $SnO_2$ | | | 0.27 | | 0.26 | 0.24 | 0.2 |
| SrO | | | — | | 0.5 | — | — |
| $TiO_2$ | | | 2.58 | | 3.1 | 3.1 | 2.5 |
| ZnO | | | 1.51 | | 1.6 | 1.5 | 1.7 |
| $ZrO_2$ | | | 1.71 | | 1.35 | 1.34 | 1.7 |
| CoO | | | 0.04 | | | | — |
| $Fe_2O_3$ | | | 0.12 | | 0.09 | 0.085 | 0.03 |
| $MnO_2$ | | | 0.03 | | 0.02 | 0.025 | — |
| $Nd_2O_3$ | | | | | | | — |
| NiO | | | 0.012 | | | | — |
| $V_2O_5$ | | | 0.023 | | 0.027 | 0.026 | 0.06 |
| Addition Mixture | | | | | | | |
| Characteristics | | | | | | | |
| Tg | | | 680 | | 672 | 670 | 674 |
| $V_A$ | | | 1332 | | 1318 | 1305 | 1310 |
| Density | | | 2.443 | | 2.444 | 2.479 | 2.438 |
| Devitrification Temperature | | | 1310 | | 1235 | 1235 | 1280 |
| T ($pO_2$ = 1 bar) | | 1548 | 1696 | 1595 | 1564 | 1600 | 1569 |
| Maximum temp. | | 1640 | 1850 | 1640 | 1640 | 1780 | 1640 |
| Melt, time | | 2 | 1 | 2 | 2 | 0.25 | 2 |

TABLE 2

Ceramization Conditions and Characteristics of Inventive Glass Ceramics and Comparison Ceramics, Samples 2, 4, 17

| | | Sample No. | | | | | | | | |
|---|---|---|---|---|---|---|---|---|---|---|
| | | 1 | 2 | 3 | 4 | 5 | 6 | 7 | 8 | 9 |
| Glass No. | | 1 | 2 | 2 | 3 | 3 | 4 | 4 | 5 | 6 |
| Ceram. Prog. | | 1 | 1 | 1 | 1 | 1 | 2 | 2 | 2 | 2 |
| $T_{max}$ | °C. | 900 | 900 | 940 | 900 | 860 | 890 | 875 | 875 | 875 |
| $t_{max}$ | min | 15 | 15 | 15 | 15 | 15 | 10 | 10 | 10 | 10 |

TABLE 2-continued

Ceramization Conditions and Characteristics of Inventive Glass Ceramics and Comparison Ceramics, Samples 2, 4, 17

Properties ceramized:

| | | | | | | | | | |
|---|---|---|---|---|---|---|---|---|---|
| Density | g/cm³ | 2.547 | 2.547 | 2.541 | | 2.546 | | 2.526 | 2.532 |
| Thermal Expansion | | | | | | | | | |
| $\alpha_{20/700}$ | $10^{-6}$ K | 0.23 | 0.58 | 0.35 | | 0.32 | | 0.01 | 0.20 |
| Transmission Standard Light C, 2° | | | | | | | | | |
| 400 nm | % | 0.04 | 0.09 | 0.02 | 0.01 | 0.02 | 0.05 | 0.06 | 0.13 | 0.11 |
| 450 nm | % | 0.16 | 0.57 | 0.27 | 0.03 | 0.10 | 0.20 | 0.25 | 0.35 | 0.31 |
| 500 nm | % | 0.31 | 1.15 | 0.61 | 0.05 | 0.17 | 0.17 | 0.22 | 0.13 | 0.13 |
| 550 nm | % | 0.78 | 2.60 | 1.40 | 0.15 | 0.48 | 0.33 | 0.43 | 0.22 | 0.24 |
| 630 nm | % | 4.81 | 10.8 | 6.65 | 1.57 | 3.85 | 4.42 | 5.32 | 5.19 | 5.34 |
| 700 nm | % | 16.7 | 27.2 | 19.8 | 8.78 | 15.9 | 18.8 | 21.2 | 24.4 | 24.5 |
| 1600 nm | % | 69.4 | 70.0 | 69.6 | 67.8 | 67.6 | 54.8 | 55.8 | 48.0 | 48.8 |
| Light Transmission | % | 1.4 | 3.9 | 2.2 | 0.4 | 1.0 | 1.0 | 1.2 | 1.0 | 1.1 |
| X Ray Diffraction | | | | | | | | | | |
| HQz-Phase Content | % | 62 | | 50 | | 60 | | 61 | 65 | 63 |
| Mean Cristallite Size | nm | 48 | | — | | 38 | | 38 | 32 | 35 |

| | | Sample No. | | | | | | | | | |
|---|---|---|---|---|---|---|---|---|---|---|---|
| | | 10 | 11 | 12 | 13 | 14 | 15 | 16 | 17 | 18 | 19 |
| Glass No. | | 7 | 8 | 8 | 9 | 10 | 11 | 11 | 13 | | 12 |
| Ceram. Prog. | | 2 | 2 | 2 | 2 | 2 | 1 | 2 | 2 | 2 | 2 |
| $T_{max}$ | °C. | 890 | 915 | 930 | 915 | 935 | 930 | 930 | 930 | 915 | 915 |
| $t_{max}$ | min | 10 | 10 | 10 | 5 | 10 | 15 | 15 | 15 | 3 | 3 |
| Properties Ceramized: | | | | | | | | | | | |
| Density | g/cm³ | 2.548 | | 2.554 | 2.540 | 2.544 | 2.522 | 2.525 | 2.527 | 2.546 | 2.543 |
| Thermal Expansion | | | | | | | | | | | |
| $\alpha_{20/700}$ | $10^{-6}$ K | 0.11 | | 0.07 | 0.02 | −0.04 | 0.02 | 0.01 | −0.14 | 0.24 | 0.23 |
| Transmission Standard Light C, 2° | | | | | | | | | | | |
| 400 nm | % | 0.07 | 0.16 | 0.14 | 0.02 | 0.06 | 0.03 | 0.03 | 0.01 | 0.03 | 0.30 |
| 450 nm | % | 0.20 | 0.57 | 0.47 | 0.16 | 0.29 | 0.18 | 0.19 | 0.04 | 0.15 | 0.38 |
| 500 nm | % | 0.16 | 0.46 | 0.37 | 0.19 | 0.29 | 0.35 | 0.37 | 0.15 | 0.28 | 0.40 |
| 550 nm | % | 0.36 | 0.86 | 0.68 | 0.51 | 0.67 | 0.85 | 0.90 | 0.92 | 0.72 | 0.85 |
| 630 nm | % | 5.37 | 8.91 | 7.48 | 7.90 | 8.51 | 5.03 | 5.21 | 9.96 | 4.72 | 5.19 |
| 700 nm | % | 22.9 | 29.4 | 26.4 | 29.3 | 29.2 | 17.4 | 17.7 | 28.6 | 17.0 | 18.3 |
| 1600 nm | % | 55.2 | 54.6 | 54.8 | 54.6 | 54.4 | 72.4 | 72.5 | 82.2 | 71.5 | 76.7 |
| Light Transmission | % | 1.2 | 2.2 | 1.8 | 1.7 | 2.0 | 1.5 | 1.6 | 2.5 | 1.4 | 1.6 |
| X Ray Diffraction | | | | | | | | | | | |
| HQz-Phase Content | % | 68 | | 70 | 75 | 72 | 64 | 64 | 73 | 62 | 63 |
| Mean Cristallite Size | nm | 38 | | 46 | 43 | 44 | 46 | 44 | 43 | 44 | 42 |

What is claimed is:

1. Transparent, dyed cook top or hob with improved color display capability, consisting of a glass-ceramic comprising high quartz mixed crystals as predominant crystal phase whereby the glass ceramic, except of some unavoidable traces, contains none of the chemical refining agents arsenic oxide and/or antimony, characterized by transmission values of greater than 0.1% within the entire wavelength range of visible light larger than 450 nm, a light transmission in the visible from 0.8 to 2.5% and a transmission in the infrared at 1600 nm of 45-85%, and wherein the glass ceramic comprises $Fe_2O_3$ and $V_2O_5$, wherein the $Fe_2O_3$ content and the $V_2O_5$ content meet the condition $$1 < Fe_2O_3/V_2O_5 < 8.$$

2. Cook top or hob according to claim 1, having transmission values of:
>0.15% at 450 nm
>0.15% at 500 nm
>0.25% at 550 nm
3-9% at 630 nm
50-80% at 1600 nm
and a light transmission in the visible of 1.0-2.0%.

3. Cook top or hob according to claim 1 having a maximum $Fe_2O_3$ content in the glass ceramic of 0.2 weight %.

4. Cook top or hob according to claim 1 having a $Fe_2O_3$ content of 0.08 to 0.15 weight %.

5. Cook top or hob according to claim 1 having a $V_2O_5$ content of 0.01 to 0.06 weight %.

6. Cook top or hob according to claim 1 wherein the glass ceramic further comprises $TiO_2$, $ZrO_2$ and $SnO_2$.

7. Cook top or hob according to claim 6, wherein the $SnO_2$ content is less than 0.6 weight % and/or the content of $Fe_2O_3$ is at least 20% of the $SnO_2$ content.

8. Cook top or hob according to claim 1, wherein the glass ceramic has a water content prior to ceramization of 0.003 to 0.005 mol.

9. Cook top or hob according to claim 1, wherein the composition of the glass ceramic (in weight % on oxide basis) consists essentially of

| | |
|---|---|
| Li$_2$O | 3.0-4.2 |
| Σ Na$_2$O + K$_2$O | 0.2-1.5 |
| MgO | 0-1.5 |
| Σ CaO + SrO + BaO | 0-4 |
| ZnO | 0-2 |
| B$_2$O$_3$ | 0-2 |
| Al$_2$O$_3$ | 19-23 |
| SiO$_2$ | 60-69 |
| TiO$_2$ | 2.5-4 |
| ZrO$_2$ | 0.5-2 |
| P$_2$O$_5$ | 0-3 |
| SnO$_2$ | 0.1-<0.6 |
| Σ TiO$_2$ + ZrO$_2$ + SnO$_2$ | 3.8-6 |
| V$_2$O$_5$ | 0.01-0.06 |
| Fe$_2$O$_3$ | 0.03-0.2 | and $1 < Fe_2O_3/V_2O_5 < 8$.

10. Cook top or hob according to claim 1, having a composition of the glass ceramic which in weight % on oxide basis contains

| | |
|---|---|
| CaO | 0.2-1 |
| SrO | 0.1-1. |

11. Cook top or hob according to claim 1, having an equilibrium oxygen partial pressure pO$_2$ of the glass ceramic and/or crystallizable starting glasses of 1 bar at a temperature greater than 1580° C.

12. Cook top or hob according to claim 11, wherein the equilibrium oxygen partial pressure is set by a temperature of the molten glass greater than 1700° C.

13. Cook top or hob according to claim 12, having a V$_2$O$_5$ content of less than 0.04 weight.

14. Cook top or hob according to claim 1, characterized in that instead of or in addition to red displays, one or more other color displays selected from blue, green, yellow, orange and white are applied.

15. Transparent, dyed cook top or hob with improved color display capability, consisting of a glass-ceramic comprising high quartz mixed crystals as predominant crystal phase whereby the glass ceramic, except of some unavoidable traces, contains none of the chemical refining agents arsenic oxide and/or antimony, characterized by transmission values of greater than 0.1% within the entire wavelength range of visible light larger than 450 nm, a light transmission in the visible from 0.8 to 2.5% and a transmission in the infrared at 1600 nm of 45-85%, and wherein the glass ceramic comprises Fe$_2$O$_3$ and V$_2$O$_5$, wherein the Fe$_2$O$_3$ content is 0.08 to 0.15 weight %.

16. Cook top or hob according to claim 15, characterized by transmission values of:
>0.15% at 450 nm
>0.15% at 500 nm
>0.25% at 550 nm
3-9% at 630 nm
50-80% at 1600 nm
and a light transmission in the visible of 1.0-2.0%.

17. Cook top or hob according to claim 15, wherein the Fe$_2$O$_3$ content and the V$_2$O$_5$ content meet the condition $1 < Fe_2O_3/V_2O_5 < 8$.

18. Cook top or hob according to claim 15, characterized in that the glass ceramic further comprises TiO$_2$, ZrO$_2$ and SnO$_2$.

19. Cook top or hob according to claim 18, having a V$_2$O$_5$ content of 0.01 to 0.06 weight %.

20. Cook top or hob according to claim 18, wherein the SnO$_2$ content is less than 0.6 weight % and/or the content of Fe$_2$O$_3$ is at least 20% of the SnO$_2$ content.

21. Cook top or hob according to claim 15, wherein the glass ceramic has a water content prior to ceramization of 0.003 to 0.005 mol.

22. A transparent, dyed cook top or hob with improved color display capability, comprising a glass-ceramic which comprises high quartz mixed crystals as predominant crystal phase whereby the glass ceramic, except as impurities present in amounts less than 500 ppm, contains none of the chemical refining agents arsenic oxide and/or antimony, and whereby the glass ceramic is characterized by transmission values of
>0.15% at 450 nm
>0.15% at 500 nm
>0.25% at 550 nm
3-9% at 630 nm
50-80% at 1600 nm,
and a visible light transmission of 0.8 to 2.5%, and wherein the glass ceramic comprises Fe$_2$O$_3$ and V$_2$O$_5$, wherein the Fe$_2$O$_3$ content is at least as high as the V$_2$O$_5$ content and thus meet the condition $< Fe_2O_3/V_2O_5 < 8$.

23. Cook top or hob according to claim 22, having a maximum Fe$_2$O$_3$ content in the glass ceramic of 0.2 weight %.

24. Cook top or hob according to claim 22, having a Fe$_2$O$_3$ content of 0.08 to 0.15 weight %.

25. Cook top or hob according to claim 22, characterized by a V$_2$O$_5$ content of 0.01 to 0.06 weight %.

26. Cook top or hob according to claim 22, wherein the glass ceramic further comprises TiO$_2$, ZrO$_2$ and SnO$_2$.

27. Cook top or hob according to claim 26, wherein the SnO$_2$ content is less than 0.6 weight % and/or the content of Fe$_2$O$_3$ is at least 20% of the SnO$_2$ content.

28. Cook top or hob according to claim 22, wherein the glass ceramic has a water content prior to ceramization of 0.003 to 0.005 mol.

29. Transparent, dyed cook top or hob with improved color display capability, consisting of a glass-ceramic comprising high quartz mixed crystals as predominant crystal phase whereby the glass ceramic, except of some unavoidable traces, contains none of the chemical refining agents arsenic oxide and/or antimony, characterized by transmission values of greater than 0.1% within the entire wavelength range of visible light larger than 450 nm, a light transmission in the visible from 0.8 to 2.5% and a transmission in the infrared at 1600 nm of 45-85%.

30. Cook top or hob according to claim 29, having transmission values of:
>0.15% at 450 nm
>0.15% at 500 nm
>0.25% at 550 nm
3-9% at 630 nm
50-80% at 1600 nm
and a light transmission in the visible of 1.0-2.0%.

31. Cook top or hob according to claim 29, wherein the composition of the glass ceramic (in weight % on oxide basis) consists essentially of

| | |
|---|---|
| Li$_2$O | 3.0-4.2 |
| Σ Na$_2$O + K$_2$O | 0.2-1.5 |
| MgO | 0-1.5 |
| Σ CaO + SrO + BaO | 0-4 |
| ZnO | 0-2 |
| B$_2$O$_3$ | 0-2 |
| Al$_2$O$_3$ | 19-23 |
| SiO$_2$ | 60-69 |
| TiO$_2$ | 2.5-4 |
| ZrO$_2$ | 0.5-2 |
| P$_2$O$_5$ | 0-3 |
| SnO$_2$ | 0.1-<0.6 |
| Σ TiO$_2$ + ZrO$_2$ + SnO$_2$ | 3.8-6 |
| V$_2$O$_5$ | 0.01-0.06 |
| Fe$_2$O$_3$ | 0.03-0.2 | and $1 < Fe_2O_3/V_2O_5 < 8$.

32. The cook top or hob according to claim 29, characterized by a composition of the glass ceramic which in weight % on oxide basis comprises

| | |
|---|---|
| CaO | 0.2-1 |
| SrO | 0.1-1. |

33. Transparent, dyed cook top or hob with improved color display capability, consisting of a glass-ceramic comprising high quartz mixed crystals as predominant crystal phase whereby the glass ceramic, except of some unavoidable traces, contains none of the chemical refining agents arsenic oxide and/or antimony, characterized by transmission values of greater than 0.1% within the entire wavelength range of visible light larger than 450 nm, a light transmission in the visible from 0.8 to 2.5% and a transmission in the infrared at 1600 nm of 45-85%, and wherein the glass ceramic comprises 600 ppm or more of Fe$_2$O$_3$.

34. Cook top or hob according to claim 33, having transmission values of:
>0.15% at 450 nm
>0.15% at 500 nm
>0.25% at 550 nm
3-9% at 630 nm
50-80% at 1600 nm
and a light transmission in the visible of 1.0-2.0%.

35. Cook top or hob according to claim 33, wherein the composition of the glass ceramic (in weight % on oxide basis) consists essentially of

| | |
|---|---|
| Li$_2$O | 3.0-4.2 |
| Σ Na$_2$O + K$_2$O | 0.2-1.5 |
| MgO | 0-1.5 |
| Σ CaO + SrO + BaO | 0-4 |
| ZnO | 0-2 |
| B$_2$O$_3$ | 0-2 |
| Al$_2$O$_3$ | 19-23 |
| SiO$_2$ | 60-69 |
| TiO$_2$ | 2.5-4 |
| ZrO$_2$ | 0.5-2 |
| P$_2$O$_5$ | 0-3 |
| SnO$_2$ | 0.1-<0.6 |
| Σ TiO$_2$ + ZrO$_2$ + SnO$_2$ | 3.8-6 |
| V$_2$O$_5$ | 0.01-0.06 |
| Fe$_2$O$_3$ | 0.03-0.2 | and $1 < Fe_2O_3/V_2O_5 < 8$.

36. The cook top or hob according to claim 33, characterized by a composition of the glass ceramic which in weight % on oxide basis comprises

| | |
|---|---|
| CaO | 0.2-1 |
| SrO | 0.1-1. |

* * * * *